April 4, 1967 S. R. SIRIGNANO ET AL 3,312,250
INSULATING SLEEVES
Filed June 6, 1963

INSULATING SLEEVE — ULTRASONIC WELD

INSULATING SLEEVE — ULTRASONIC WELD

FIBROUS WEB — FIBROUS WEB — ULTRASONICALLY BONDED AREA

ULTRASONICALLY BONDED AREA — FIBROUS WEB — FIBROUS WEB — ORIENTED FILM

INVENTORS
STANLEY R. SIRIGNANO
EUGENE J. STIFTER
BY Carpenter, Kinney & Coulter
ATTORNEYS

3,312,250
INSULATING SLEEVES
Stanley R. Sirignano, White Bear Lake, and Eugene J. Stifter, St. Paul Park, Minn., assignors to Minnesota Mining and Manufacturing Company, St. Paul, Minn., a corporation of Delaware
Filed June 6, 1963, Ser. No. 286,110
10 Claims. (Cl. 138—128)

This invention relates to new and useful electrical insulating sleeves and to their method of preparation.

Insulating sleeves have been prepared from various materials. At this time the materials most widely employed commercially for this purpose are braided filaments of glass, cotton or rayon. The preparation of the braided sleeves is relatively expensive and insulating sleeves from the braided material have known disadvantages when coated. For instance, the braided structure leaves unsupported many areas when a coating is applied to it. When flexed repeatedly, as is common in applications to which they are applied, the coating frequently fractures in the unsupported areas. Likewise, the unsupported areas are susceptible to being cut. Another technique for the preparation of sleeves is to utilize an extruded tubing, but such tubings have many recognized disadvantages.

In accordance with this invention, it has been discovered that insulating sleeves which have both practical and economical advantages over sleeves of the prior art may be prepared by wrapping a strip of webbing prepared from oriented thermoplastic fibers edge to edge in an overlap fashion and ultrasonically welding the overlapping portions to each other. As such, the malleable fibers in the initial strip of webbing are spot welded to form a sleeve which acts as if it were of substantially uniform porosity in that it inherently takes a uniform coating when dipped in a coating resin.

Figure 1:
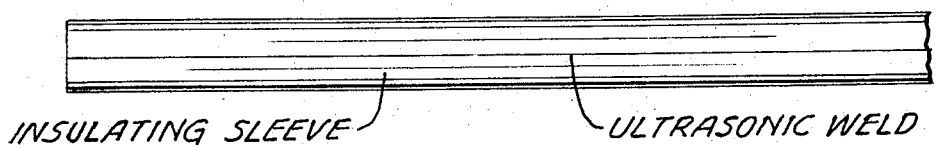
FIGURE 1 illustrates a sleeve prepared from a strip of non-woven fibrous web by overlapping the two edges of the strip as is conventional in the preparation of a cigarette.
Figure 2:
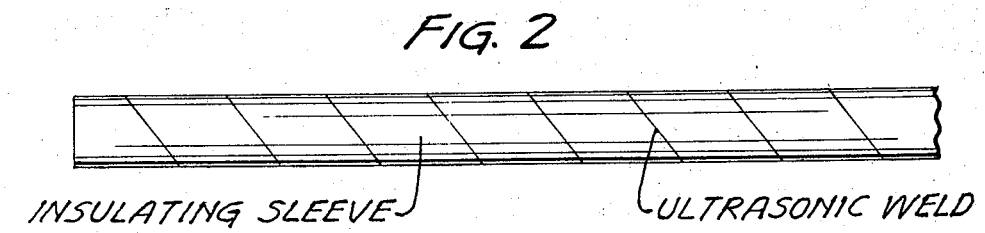
FIGURE 2 represents an analogous sleeve prepared by wrapping the strip spirally upon itself.
Figure 3:
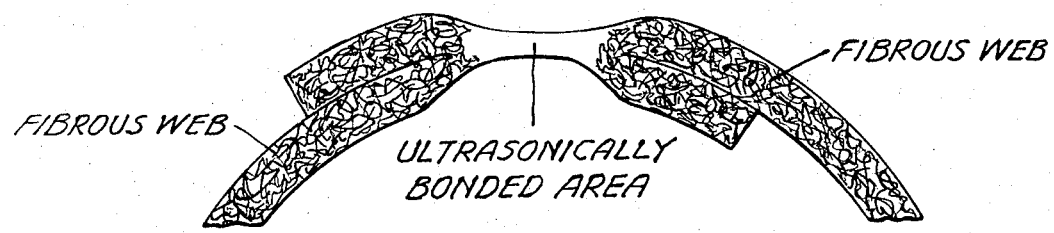
FIGURE 3 is a fragmentary and greatly enlarged end view of a sleeve of this invention formed from a non-woven fibrous web.
Figure 4:
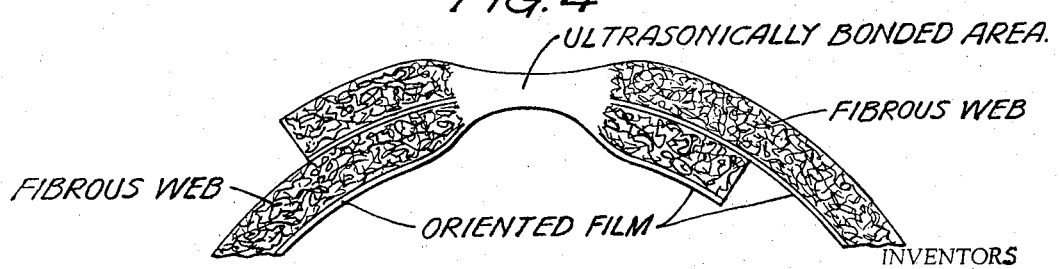
FIGURE 4 is a fragmentary and greatly enlarged end view of a sleeve of this invention formed from a fibrous web laminate of non-woven fibers and oriented film.

The preferred thermoplastic web materials are oriented fibers of polyethylene terephthalate. Although woven webs may be used, it is highly preferable to use strips of non-woven webs. One method of preparing such a webbing is to mix fibers of oriented and unoriented or at most only slightly oriented polyethylene terephthalate fibers and to bond the fibers together autogenously under pressure at a temperature near the softening point of the unoriented fibers. In this manner, a uniformly strong, porous, highly absorbent web is obtained which is 100% polyethylene terephthalate. Also suitable is polyethylene terephthalate paper, polyethylene terephthalate paper containing inerts such as mica, and polyethylene terephthalate fibers laminated to a polyethylene terephthalate film.

The absence of adhesives and binders in the sleeves of this invention is a significant advantage because the presence of such incompatible materials would interfere with the electrical properties of the sleeve or resulting tubing. However, certain inerts may be included that perform no function in the construction of the web itself. As such, a web consisting of thermoplastic fibers embraces cloths containing small amounts of non-fibrous inerts.

The sleeves of this invention are useful as covers for lead wires in motors, transformers, generators and electronic devices. They are useful by themselves but are employed for the most part covered with an organic polymer coating. Suitable coating materials include oleoresinous varnishes, flexible epoxy resins, polyvinyl chloride plastisols, oil-modified alkyds, cross-linked organic rubbers, such as polyurethanes, natural rubber and organosilicone polymers. The selection of the coating material is determined by the end use contemplated for the sleeve. Factors to be considered include use, voltage and temperature, chemical environment, and so forth. For instance, whether the sleeve is designed as a Class A, B, F or H insulator will determine to a large extent the type of coating resin that may be used. Although sleeves up to 12 inches in diameter may be prepared, it will be appreciated that sleeves having a diameter corresponding to American Wire Gauge (AWG) sizes of 22 to 0 have the greatest utility.

In evaluating the sleeves of this invention conventional tests were employed as well as the following test for mechanical cut-through.

MECHANICAL CUT-THROUGH TEST

In testing the ability of the polymer coated sleeves to withstand mechanical cut-through at elevated temperatures, the coated sleeves are placed on a mandrel suspended in an oven heated to the designated test temperature. A 0.025 inch copper wire attached at both ends to a 1 pound weight is then placed over the coated sleeve. The time required to reach a breakdown voltage value of less than 2000 volts is considered the point at which the sample fails. To determine the breakdown voltage, the samples are removed from the oven and the area to which the wire was attached is wrapped with a lead foil. Thus, the electrodes are the inner mandrel and the foil overwrap.

The following examples illustrate representative preferred embodiments of this invention.

Example I

A strip, .005 inch thick and 0.750 inch wide, of a non-woven fibrous web comprising oriented polyethylene terephthalate fibers was helically wrapped onto a steel mandrel having a diameter of 0.340 inch with an overlap of 0.19 inch at the abutting edges. The overlap edges of the strips were welded on the supporting mandrel using a Raytheon Model 2–334 ultrasonic welder to form a continuous tubular sleeve. In this ultrasonic welder, the cone vibrates at a frequency of about 25,000 cycles per second through an amplitude of $1.5 \times 10^{-3}$ inches. The pressure with which the cone is placed in contact with the web is such that the web is not cut or damaged. Thus, a sleeve of uniform porosity is achieved, that is to say, uniform in its acceptance of a uniform coating when dipped in a coating resin such that the coated sleeve provides the same degree of electrical insulation at the weld as at other points of the sleeve.

The sleeve prepared as described above and cut in 3 foot pieces was dipped into a toluene solution of electrical insulating resin composed of a branched chain carboxyl terminated polyester and a liquid epoxy resin. This coating resin is described in Example 1 of U.S. Patent No. 3,027,279. After dipping, the coated sleeve was heated at 170° F. for 10 minutes to remove solvent and then cured at 392° F. for 35 minutes. A second coating of the insulating resin was then applied and cured in the same manner.

The resulting coated tube broke down electrically at 8000 volts and had excellent resistance to mechanical cut-through at 350° F. as evidenced by a reduction in the breakdown voltage to about 6000 volts after seven days at this temperature using the test described above. By way of comparison, a braided fiber glass tube coated with the same resin composition had an electrical breakdown voltage of less than 2000 volts in this test after 24 hours at 350° F.

*Example II*

Sleeves were prepared as in Example I from a laminate composed of 0.005 inch thick non-woven web of oriented polyethylene terephthalate fibers and 0.001 inch thick biaxially oriented polyethylene terephthalate film. When coated with the polyester-epoxy resin composition used in Example I above to a wall thickness of 0.010 inch, the coated sleeve had a breakdown voltage of 12,000 volts.

*Examples III and IV*

Strips (0.004 inch thick and 1 inch wide) of woven plain weave polyethylene terephthalate and polyhexamethylene-adipamide (nylon 66) fibers were employed to prepare good insulating sleeves by the procedure of Example I.

*Example V*

Three-foot portions of the sleeving prepared in Example I were dipped into a 50% solids toluene solution of Epon 828, a product of Shell Chemical Company, and a carboxyl terminated polyneopentyl sebacate. After dipping, the coated sleeve was drained and then heated at 170° F. for 10 minutes to remove solvent and then cured at 392° F. A second coating of the insulating resin was then applied and cured in the same manner.

The resulting coated sleeve of this example had a wall thickness of 0.010 inch and exhibited outstanding conformity to wires which were bent at sharp angles as well as a high electrical breakdown and resistance to mechanical cut-through.

*Example VI*

Three-foot portions of the sleeving prepared as in Example I were coated with an oleo resinous vanish by dipping the sleeve in a 50% solids mineral spirits solution, drying at 170° F. for 10 minutes to remove solvent and curing at 350° F. for 30 minutes. A second coating of the varnish was then applied and cured in the same manner.

The resulting coated sleeve of this example had a wall thickness of 0.010 inch and exhibited outstanding conformity to wires which were bent at sharp angles and a high electrical breakdown of 7000 volts. A comparable varnish coated sleeve of braided fiberglass was stiff and cracked when flexed.

*Example VII*

Three-foot portions of the sleeving prepared as in Example I, upon being dipped into a 25% solids toluene solution of a silicone rubber K 1205, a product of Union Carbide Company, and 3% crystalline benzoyl peroxide, were heated at 200° F. and cured at 350° F. for 10 minutes to produce insulated sleeves with a tough rubbery coating suitable for high temperature applications.

*Example VIII*

The sleeve of Example I, when coated with plasticized polyvinyl chloride resin to a wall thickness of 0.010 inch, resulted in a coated sleeve having a breakdown voltage of about 8000 volts and which was very flexible.

*Example IX*

A 0.005 inch thick and 1.06 inch wide strip of non-woven fibrous web comprising oriented polyethylene terephthalate fibers was wrapped over a steel mandrel, having a diameter of 0.275 inch, edge to edge longitudinally (helix angle 180°) with an overlap of 0.19 inch at the abutting edges. The overlap edges of the strip were welded on the supporting mandrel using a Raytheon Model 2–334 ultrasonic welder to form a continuous tubular sleeve in the manner set forth in Example I except that the sleeve had a longitudinal seam in the fashion of a cigarette as contrasted to the spiral seam of the sleeve in Example I.

The sleeve prepared as described above and cut in 3-foot pieces was dipped into a toluene solution of electrical insulating resin composed of a branched chain carboxyl terminated polyester and a liquid epoxy resin. This coating resin is described in Example 1 of U.S. Patent No. 3,027,279. After dipping, the coated sleeve was heated at 170° F. for 10 minutes to remove solvent and then cured at 392° F. for 35 minutes. A second coating of the insulating resin was then applied and cured in the same manner to produce a coated sleeve having a wall thickness of 0.010 inch. The resulting coated tube broke down electrically at 8000 volts.

*Example X*

Sleeves were prepared as in Example I from a laminate composed of 0.004 inch thick non-woven web of oriented poly-bisphenol-A carbonate fibers and 0.00035 inch thick oriented poly-bisphenol A carbonate film and were found to be good insulating sleeves.

We claim:
1. An insulating sleeve consisting essentially of a strip of a fibrous web comprising oriented fibers of a thermoplastic polymer ultrasonically welded together edge to edge in an overlap fashion.
2. An insulating sleeve consisting essentially of a strip of a non-woven fibrous web comprising oriented fibers of polyethylene terephthalate ultrasonically welded together edge to edge in an overlap fashion.
3. A plastic coated insulating sleeve consisting essentially of a strip of a fibrous web comprising oriented fibers of a thermoplastic polymer ultrasonically welded together spirally edge to edge in an overlap fashion and impregnated with a uniform coating of an organic polymer.
4. The coated sleeve of claim 3 in which the coating resin is flexible epoxy resin.
5. The coated sleeve of claim 3 in which the coating resin is oleo-resinous varnish.
6. The coated sleeve of claim 3 in which the coating resin is oil-modified alkyd resin.
7. The coated sleeve of claim 3 in which the coating resin is plasticized polyvinyl chloride.
8. The coated sleeve of claim 3 in which the coating resin is a cross-linked organo-silicone polymer.
9. A method for producing an electrical insulating sleeve which comprises winding a strip of a fibrous web comprising oriented fibers of a thermoplastic polymer so as to overlap the two edges of the strip and ultrasonically welding the two edges to each other to produce a sleeve which when dipped in coating resin provides the same degree of electrical insulation at the weld as at other points of the sleeve.
10. The sleeve of claim 1 in which the fibrous web is a laminate comprising said fibers and oriented polyester film.

References Cited by the Examiner

UNITED STATES PATENTS

| | | | |
|---|---|---|---|
| 893,857 | 7/1908 | Lutz et al. | 138—129 |
| 2,577,427 | 12/1951 | McDermott et al. | 138—129 |
| 2,633,894 | 4/1953 | Carwile | 156—73 |
| 2,941,911 | 6/1960 | Kumnick et al. | 138—129 X |
| 3,018,800 | 1/1962 | Hanssens | 138—125 |
| 3,022,814 | 2/1962 | Bodine | 156—73 |
| 3,205,913 | 9/1965 | Ehlers | 138—125 |

LAVERNE D. GEIGER, *Primary Examiner.*

LEWIS J. LENNY, T. L. MOORHEAD,
*Assistant Examiners.*